United States Patent
Menon (10) Patent No.: US 11,169,302 B2
(45) Date of Patent: *Nov. 9, 2021

(54) METHODS AND COMPUTING SYSTEMS FOR GEOSCIENCES AND PETRO-TECHNICAL COLLABORATION

(71) Applicant: WESTERNGECO L.L.C., Houston, TX (US)

(72) Inventor: Shashi Menon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1369 days.

This patent is subject to a terminal disclaimer.

(21) Appl. No.: 14/832,724

(22) Filed: Aug. 21, 2015

(65) Prior Publication Data

US 2015/0355375 A1 Dec. 10, 2015

Related U.S. Application Data

(63) Continuation of application No. 14/151,607, filed on Jan. 9, 2014, now Pat. No. 9,117,200.

(Continued)

(51) Int. Cl.
*G01V 99/00* (2009.01)
*G06Q 10/10* (2012.01)
(Continued)

(52) U.S. Cl.
CPC ............ *G01V 99/005* (2013.01); *G06F 3/017* (2013.01); *G06F 3/04815* (2013.01);
(Continued)

(58) Field of Classification Search
CPC ... G01V 99/005; G06F 3/017; G06F 3/04815; G06Q 10/0633
(Continued)

(56) References Cited

U.S. PATENT DOCUMENTS 6,583,808 B2  6/2003  Boulanger et al.
6,795,108 B2  9/2004  Jarboe et al.
(Continued)

FOREIGN PATENT DOCUMENTS

CN  1512339 A  7/2004
CN  1639721 A  7/2005
(Continued)

OTHER PUBLICATIONS

Office Action issued in related EP application 14738333.5 dated Nov. 17, 2015, 8 pages.
(Continued)

*Primary Examiner* — Eman A Alkafawi
(74) *Attorney, Agent, or Firm* — Michael Guthrie (57) ABSTRACT

Computing systems and methods for geosciences collaboration are disclosed. In one embodiment, a method for geosciences collaboration includes obtaining a first set of geosciences information from a first computer system of the plurality of computer systems; distributing the first set of geosciences information from the first computer system to at least a second computer system; receiving a user input from the second computer system of the plurality of computer systems, the user input entered manually by a user; providing the user input to the first computer system; in response to providing the user input to the first computer system, receiving a revised set of geosciences information from the first computer system; and repeating the receiving a user input, the providing the user input, and the receiving the revised set of geosciences information until the revised set of geosciences information is determined to satisfy accuracy criteria.

30 Claims, 4 Drawing Sheets

Related U.S. Application Data (60) Provisional application No. 61/750,896, filed on Jan. 10, 2013.

(51) Int. Cl.

| | | |
|---|---|---|
| *G06F 3/01* | (2006.01) | |
| *G06F 3/0481* | (2013.01) | |
| *G06Q 10/06* | (2012.01) | |
| *H04L 12/18* | (2006.01) | |

(52) U.S. Cl.
CPC ....... *G06Q 10/067* (2013.01); *G06Q 10/0633* (2013.01); *G06Q 10/101* (2013.01); *G06Q 10/103* (2013.01); *H04L 12/1813* (2013.01)

(58) Field of Classification Search
USPC .................. 702/2, 4, 16, 14, 15; 715/863
See application file for complete search history.

(56) References Cited

U.S. PATENT DOCUMENTS

| | | | |
|---|---|---|---|
| 7,031,842 | B1 | 4/2006 | Musat et al. |
| 7,532,232 | B2 | 5/2009 | Shah et al. |
| D610,105 | S | 2/2010 | Graham et al. |
| 7,692,680 | B2 | 4/2010 | Graham et al. |
| D618,644 | S | 6/2010 | Graham et al. |
| 7,805,246 | B2 | 9/2010 | Chakrapani et al. |
| 8,144,181 | B2 | 3/2012 | Gladstone |
| D663,707 | S | 7/2012 | Derocher et al. |
| 8,264,519 | B2 | 9/2012 | Lunde et al. |
| 8,269,814 | B2 | 9/2012 | Shah et al. |
| 8,289,362 | B2 | 10/2012 | Baird |
| 8,300,078 | B2 | 10/2012 | Lovhaugen et al. |
| 2002/0184236 | A1 | 12/2002 | Donath et al. |
| 2005/0268823 | A1 | 12/2005 | Bakker et al. |
| 2006/0158509 | A1 | 7/2006 | Kenoyer et al. |
| 2006/0168302 | A1 | 7/2006 | Boskovic et al. |
| 2007/0070177 | A1 | 3/2007 | Christensen |
| 2007/0206091 | A1 | 9/2007 | Dunn et al. |
| 2007/0271039 | A1 | 11/2007 | Ella et al. |
| 2007/0294299 | A1 | 12/2007 | Goldstein et al. |
| 2008/0162248 | A1 | 7/2008 | Vachon et al. |
| 2008/0208475 | A1 | 8/2008 | Karr et al. |
| 2009/0207234 | A1 | 8/2009 | Chen et al. |
| 2009/0265110 | A1 | 10/2009 | Narayanan et al. |
| 2011/0161133 | A1* | 6/2011 | Staveley ................ E21B 44/00 705/7.28 |
| 2011/0202510 | A1 | 8/2011 | Salemann |
| 2011/0264430 | A1 | 10/2011 | Tapscott et al. |
| 2011/0272144 | A1 | 11/2011 | Belcher et al. |
| 2012/0232778 | A1 | 9/2012 | Deubzer et al. |
| 2012/0331404 | A1 | 12/2012 | Buford et al. |
| 2014/0195611 | A1 | 7/2014 | Menon |
| 2015/0169165 | A1* | 6/2015 | Bacus ................ G06F 3/04883 715/863 |

FOREIGN PATENT DOCUMENTS

| | | |
|---|---|---|
| CN | 101075275 A | 11/2007 |
| CN | 101371164 A | 2/2009 |
| CN | 101741696 A | 6/2010 |
| CN | 102148862 A | 8/2011 |

OTHER PUBLICATIONS

International Search Report and Written Opinion of PCT Application No. PCT/US2014/011016 dated Jun. 26, 2014: pp. 1-14.
International Preliminary Report on Patentability issued in the related PCT application PCT/US2014/011016, dated Jul. 14, 2015 (10 pages).
IUGS Commission on Geoscience Education, Training and Technology Transfer—Jesus Martinez Frias, IUGS/USGS, Feb. 2012 (17 pages).
Supplementary European Search Report issued in the EP Application 14738333.5 dated Nov. 4, 2015 (2 pages).
Office Action issued in the MX application MX/a/2015/008936, dated Jan. 13, 2017 (5 pages).
First Office Action issued in the CN application 201480008124.2, dated Dec. 26, 2016 (36 pages).
Second Office Action issued in the CN application 201480008124.2, dated Sep. 19, 2017 (26 pages).
Examination Report issued in the SA application 515360743, dated Sep. 4, 2018 (12 pages).
First Examination Report issued in the AU application 2014205284, dated Nov. 1, 2018 (3 pages).
Second Examination Report issued in the AU application 2014205284, dated Mar. 8, 2019 (4 pages).
Extended European Search Report issued in the EP Application 19162039.2 dated May 10, 2019 (11 pages).
Third Examination Report issued in the AU application 2014205284, dated Oct. 17, 2019 (3 pages).
Examination Report issued in the AE application895/2015, dated Nov. 24, 2019 (11 pages).
Office Action issued in the BR application 1 12015016648.2, dated Feb. 14, 2020 (8 pages).
Office Action issued in the EP Application 19162039.2 dated Apr. 23, 2020 (5 pages).
First Examination Report issued in the CA application 2897047 Jan. 22, 2020 (4 pages).
Second Examination Report issued in the CA application 2897047 Dec. 8, 2020 (4 pages).

* cited by examiner

Figure 5

METHODS AND COMPUTING SYSTEMS FOR GEOSCIENCES AND PETRO-TECHNICAL COLLABORATION

CROSS-REFERENCE TO RELATED APPLICATION

This application is a continuation of co-pending U.S. patent application Ser. No. 14/151,607 filed Jan. 9, 2014 which claims the benefit of U.S. Provisional Patent Application Ser. No. 61/750,896 filed Jan. 10, 2013. Each of the aforementioned related patent applications are incorporated herein by reference in its entirety.

TECHNICAL FIELD

The disclosed embodiments relate generally to methods and computing systems for geosciences collaboration.

BACKGROUND

One of the key challenges in the petro-technical services business is the ability to interact collaboratively between petro-technical experts and/or with petro-technical services clients. Traditionally, this has been done by having a client representative and petro-technical expert(s) in one location, and often, in the same room. In cases where remote interactions between parties have been sought, audio conference and internet based sessions like Webex and Microsoft Net Meeting have been used. While some existing solutions allow for simplistic collaboration like joint editing of a document, existing solutions do not readily facilitate complex collaborations on geosciences applications, models, structural plans, drilling plans and the like between multiple parties at different sites.

Accordingly, there is a need for methods and computing systems that can employ more effective and accurate methods for facilitating complex collaborations on geosciences applications, models, structural plans, drilling plans and the like between multiple parties at different sites.

SUMMARY

The computing systems, methods, processing procedures, techniques and workflows disclosed herein provide more efficient and/or effective methods for facilitating complex collaborations on geosciences applications, models, structural plans, drilling plans and the like between multiple parties at different sites. As used herein, "geosciences" is used interchangeably with "petro-technical."

In some embodiments, a method for use at a geosciences collaboration system is provided that includes: instantiating a geosciences collaboration workspace on a computing system that includes a plurality of computer systems; and in response to a first user input at a computer system in the plurality of computer systems, wherein the first user input corresponds to an instruction to start an application in the geosciences collaboration workspace, sharing the application on one or more of the plurality of computer systems in the geosciences collaboration workspace, wherein the geosciences collaboration system manages a plurality of respective user interactions with the application.

In some embodiments, a method performed at a geosciences collaboration system with one or more processors and memory is provided. The geosciences collaboration system is configured for communicating with a plurality of computer systems. The method includes obtaining a first set of geosciences information from a first computer system of the plurality of computer systems; distributing the first set of geosciences information from the first computer system to at least a second computer system located remotely from the first computer system; and receiving a user input from the second computer system of the plurality of computer systems, the user input entered manually by a user; providing the user input entered manually by the user to the first computer system. The method also includes, in response to providing the user input entered manually by the user to the first computer system, receiving a revised set of geosciences information from the first computer system. The revised set of geosciences information is distinct from the first set of geosciences information. The method further includes repeating the receiving a user input entered manually by the user, the providing the user input, and the receiving the revised set of geosciences information until the revised set of geosciences information is determined to satisfy accuracy criteria.

In some embodiments, a method performed at a first computer system with one or more processors and memory is provided. The method includes obtaining a first set of geosciences information; sending the first set of geosciences information to a geosciences collaboration system; receiving from the geosciences collaboration system a user input, the user input entered manually by a user into a second computer system located remotely from the first computer system. The method also includes, after receiving from the geosciences collaboration system the user input: obtaining a revised set of geosciences information; and sending the revised set of geosciences information to the geosciences collaboration system. The revised set of geosciences information is distinct from the first set of geosciences information. The method further includes repeating the receiving a user input entered manually by the user, the obtaining the revised set of geosciences information, and the sending the revised set of geosciences information until the revised set of geosciences information is determined to satisfy accuracy criteria.

In some embodiments, a method performed at a geosciences collaboration system with one or more processors and memory is provided. The geosciences collaboration system is configured for communicating with a plurality of computer systems. The method includes invoking a first geosciences application on a first computer system of the plurality of computer systems; obtaining a first set of geosciences information from the first computer system; and invoking a second geosciences application on a second computer system of the plurality of computer systems. At least one of the first computer system and the second computer system is located remotely from the geosciences collaboration system. The method also includes obtaining a second set of geosciences information from the second computer system; distributing the first set of geosciences information obtained from the first computer system to the plurality of computer systems; and distributing the second set of geosciences information obtained from the second computer system to the plurality of computer systems.

In some embodiments, a method performed at a first computer system with one or more processors and memory is provided. The method includes receiving an invocation of a first geosciences application from a geosciences collaboration system; obtaining a first set of geosciences information; sending the first set of geosciences information to the geosciences collaboration system; and receiving from the geosciences collaboration system a second set of geosciences information. The second set of geosciences information is obtained by the geosciences collaboration system from a second geosciences application on a second computer system located remotely from the first computer system, the second geosciences application on the second computer system having been invoked by the geosciences collaboration system.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, one or more programs stored in the at least one memory, and means for performing any method disclosed herein.

In some embodiments, an information processing apparatus for use in a computing system is provided that includes means for performing any method disclosed herein.

In some embodiments, a geosciences collaboration system is provided. The geosciences collaboration system includes: one or more processors; storage media storing one or more programs for execution by the one or more processors; and a network interface configured for communicating, over a data network, with a plurality of computer systems, the plurality of computer systems including a first computer system and a second computer system. The first computer system is located remotely from the second computer system. The geosciences collaboration system also includes a collaboration module, including a user application handling submodule configured for obtaining a first set of geosciences information from the first computer system. The collaboration module is configured for: distributing the first set of geosciences information from the first computer system to at least the second computer system; receiving a user input from the second computer system, the user input entered manually by a user; providing the user input entered manually by the user to the first computer system; in response to providing the user input entered manually by the user to the first computer system, receiving a revised set of geosciences information from the first computer system, the revised set of geosciences information distinct from the first set of geosciences information; and repeating the receiving a user input entered manually by the user, the providing the user input, and the receiving the revised set of geosciences information until the revised set of geosciences information is determined to satisfy accuracy criteria.

In some embodiments, a geosciences collaboration system is provided. The geosciences collaboration system includes: one or more processors; storage media storing one or more programs for execution by the one or more processors; and a network interface configured for communicating, through over a data network, with a plurality of computer systems. The geosciences collaboration system also includes a collaboration module, including a user application handling submodule configured for invoking a first geosciences application on a first computer system of the plurality of computer systems and obtaining a first set of geosciences information from the first computer system and invoking a second geosciences application on a second computer system of the plurality of computer systems and obtaining a second set of geosciences information from the second computer system. At least one of the first computer system and the second computer system is located remotely from the geosciences collaboration system. The collaboration module is configured for distributing the first set of geosciences information obtained from the first computer system to the plurality of computer systems and the second set of geosciences information obtained from the second computer system to the plurality of computer systems.

These systems, methods, processing procedures, techniques and workflows increase geosciences application and data collaboration. Such systems, methods, processing procedures, techniques and workflows may complement or replace conventional methods for geosciences application and data collaboration.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing Systems

Figure 1:
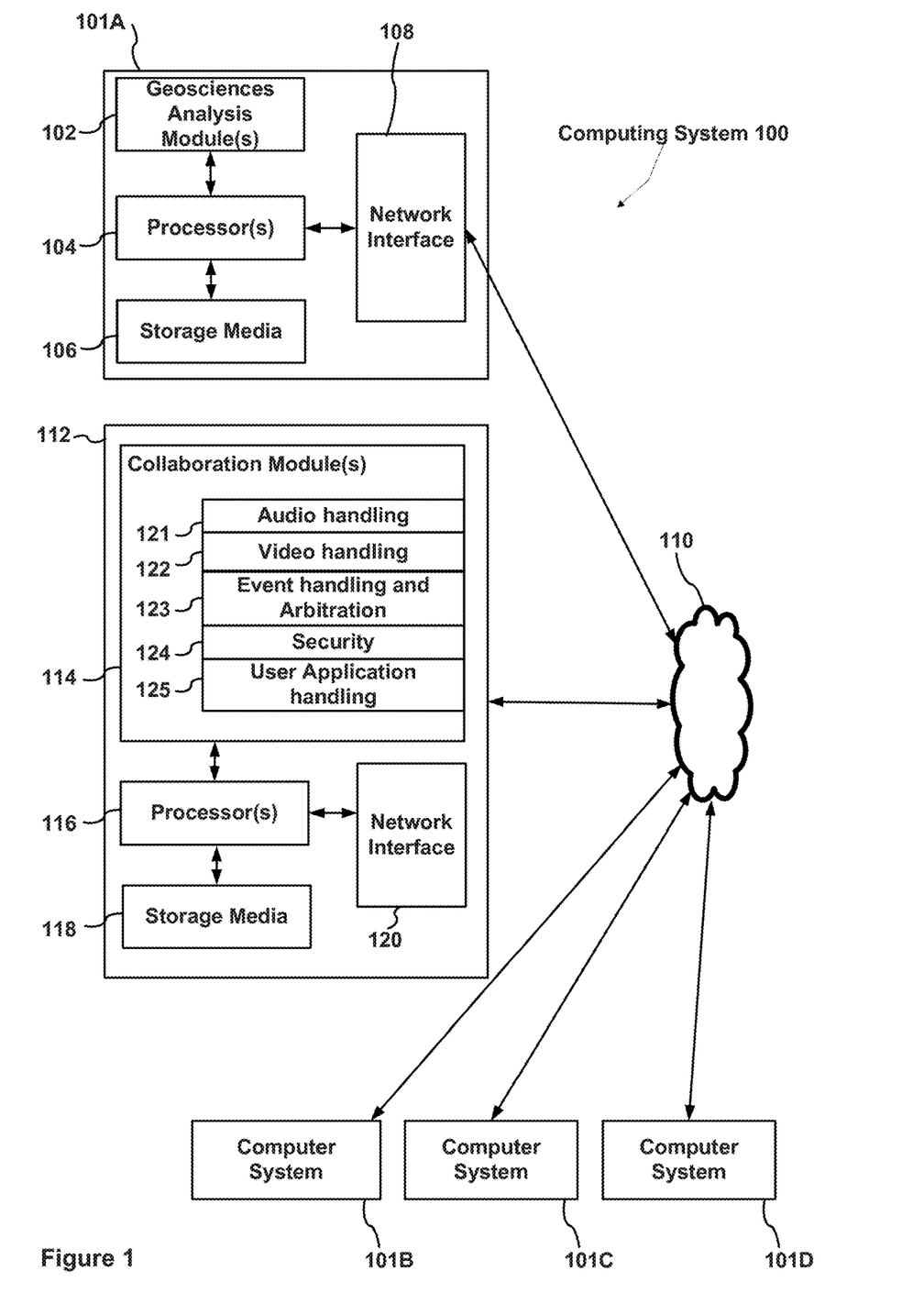
FIG. 1 illustrates a computing system in accordance with some embodiments.

FIG. 1 depicts an example computing system 100 in accordance with some embodiments. The computing system 100 can be an individual computer system 101A or an arrangement of distributed computer systems. The computer system 101A includes one or more geosciences analysis modules 102 that are configured to perform various tasks according to some embodiments, such as one or more methods disclosed herein. To perform these various tasks, geosciences analysis module 102 executes independently, or in coordination with, one or more processors 104, which is (or are) connected to one or more storage media 106A. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents). Note that data network 110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 106A can be implemented as one or more computer-readable or machine-readable storage media. Note that while in the exemplary embodiment of FIG. 1 storage media 106A is depicted as within computer system 101A, in some embodiments, storage media 106A may be distributed within and/or across multiple internal and/or external enclosures of computing system 101A and/or additional computing systems. Storage media 106A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computer system 101A is only one example of a computing system, and that computer system 101A may have more or fewer components than shown, may combine additional components not depicted in the example embodiment of FIG. 1, and/or computer system 101A may have a different configuration or arrangement of the components depicted in FIG. 1. The various components shown in FIG. 1 may be implemented in hardware, software, or a combination of both hardware and software, including one or more signal processing and/or application specific integrated circuits.

It should also be appreciated that while no user input/output peripherals are illustrated with respect to computer systems 101A, 101B, 101C, and 101D, many embodiments of computing system 100 include computing systems with keyboards, mice, touch screens, displays, etc. Some computing systems in use in computing system 100 may be desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geosciences collaboration system 112 includes processor(s) 116, storage media 118, and network interface 120, which in some embodiments may be analogous to the processor(s), storage media, and network interfaces discussed with respect to computing system 100A. Geosciences collaboration system 112 also includes collaboration module(s) 114. In this example there are a number of modules designed to facilitate communication, content delivery, security, collaborative application handling, and other functions needed to facilitate geosciences collaboration by users at one or more of the computing systems 101A, 101B, 101C, and/or 101D. Specifically, collaboration module 114 includes the following submodules.

Audio handling submodule 121 provides for recording and delivery of sound (e.g., speech, computing system events, etc.) from one computing system, such as computing system 101A, to one or more computing systems in the geosciences collaboration (e.g., computing systems 101B and 101C).

Video handling submodule 122 provides for capture and delivery of displayed content (e.g., the display of video from a computing system running a geosciences application) from one computing system, such as computing system 101A, to one or more computing systems in the geosciences collaboration (e.g., computing systems 101B and 101C).

User Application handling submodule 125 provides for application handling in the geosciences collaboration amongst a plurality of computing systems. For example, a user may invoke an application on computing system 101A that she wishes to share and collaborate on with others at computing systems 101B and 101C. Geosciences collaboration system 112 will communicate via appropriate means (e.g., multi-system interprocess control mechanisms such as sockets, RPC, etc.) with computing system 101A to obtain necessary information to facilitate collaboration between users at computing systems 101A, 101B, and 101C.

Of course, in some embodiments, one or more of the computing systems in the collaboration may be in a "listen and see only" mode where the application(s), whiteboard(s), and/or other elements of the collaboration are only broadcast from one computing system to another. In some embodiments, this may be accomplished by configuring User Application handling submodule 125 to be in a broadcast mode.

Event handling and arbitration submodule 123 provides control so that respective inputs from a plurality of users on a plurality of computing systems in the geosciences collaboration are handled in an appropriate way, e.g., the sequence as originally input amongst the users, conflicting inputs or instructions generate appropriate actions, etc.

Security submodule 124 ensures that only the computing systems involved in the geosciences collaboration are specifically given access to the content of the geosciences collaboration.

Attention is now directed to geosciences collaboration procedures, methods, techniques, and workflows that are in accordance with some embodiments. Some operations in the processing procedures, methods, techniques and workflows disclosed herein may be combined and/or the order of some operations may be changed. It is important to recognize that in geosciences collaborations, various geologic interpretations, sets of assumptions, and/or domain models such as velocity models, may be refined in an iterative fashion amongst collaborators; this concept is applicable to the procedures, methods, techniques and workflows as discussed herein. This iterative refinement can include use of feedback loops executed on an algorithmic basis, such as at a computing device (e.g., computing system 100, FIG. 1), and/or through manual control by a user who may make determinations regarding whether a given step, action, template, or model has become sufficiently accurate—this is part of the nature of geosciences collaborations.

Figure 2:
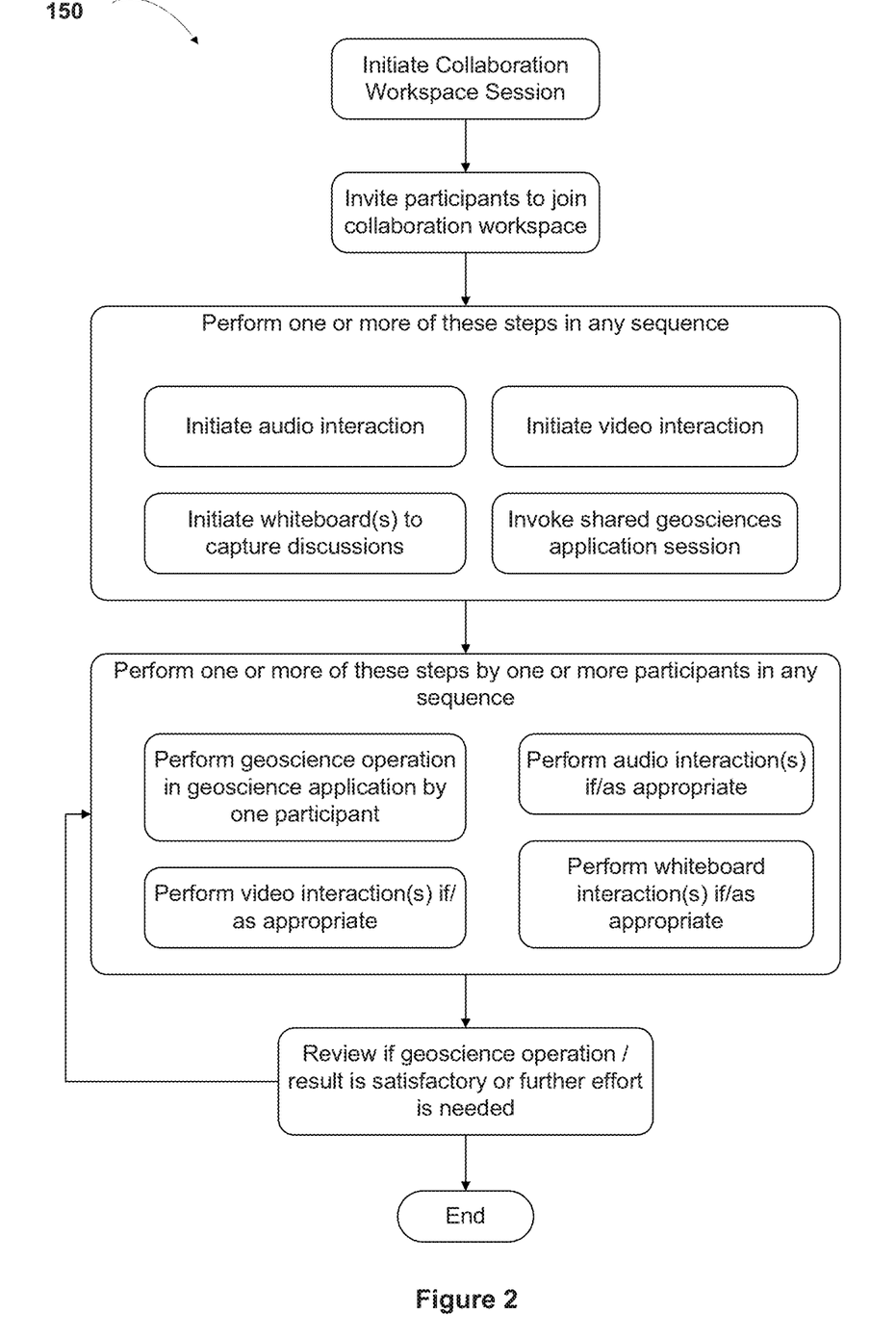
FIG. 2 is a flow chart illustrating an example method in accordance with the techniques disclosed in this application.

FIG. 2 illustrates a sample workflow 150 for geosciences collaboration that may be performed on a computing system including a geosciences collaboration system, such as the example computing system 100 in FIG. 1.

Figure 3:
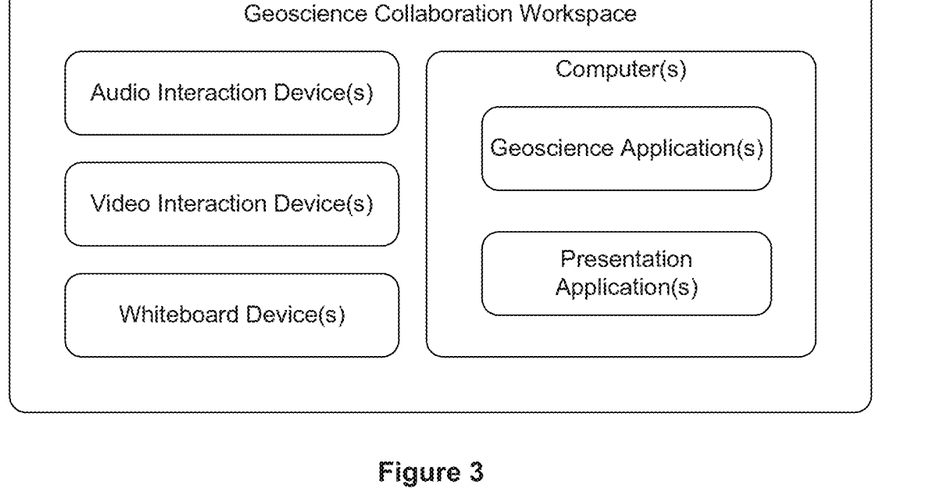
FIG. 3 illustrates a geosciences collaboration workspace in accordance with some embodiments.

FIG. 3 illustrates a geosciences collaboration workspace that may be performed on a computing system including a geosciences collaboration system, such as the example computing system 100 in FIG. 1. In various embodiments, geosciences collaboration workspaces may include one or more of the following as illustrated in FIG. 3.

One or more geoscience applications shared amongst participants in a collaboration session;

One or more video streams shared amongst participants in a collaboration session;

One or more audio streams amongst participants in a collaboration session;

One or more presentations shared amongst participants in a collaboration session; and/or One or more whiteboards shared amongst participants in a collaboration session.

In varying embodiments, participants in the workspace can choose to interact with one or more of the above mentioned elements of the workspace at any given time.

Figure 4:
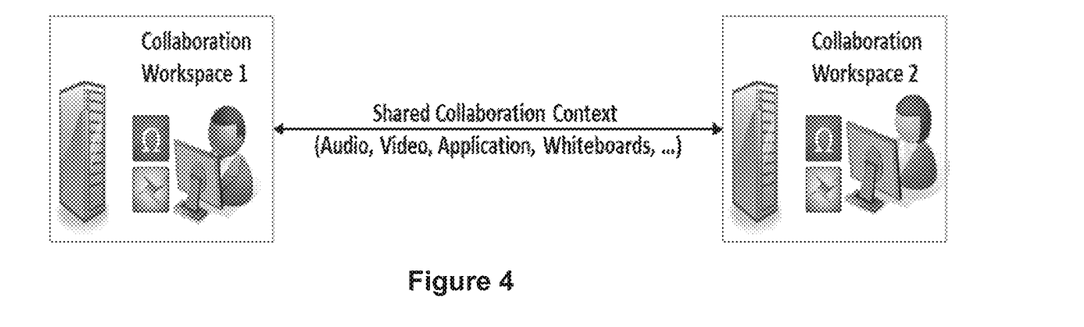
FIGS. 4 and 5 illustrate geosciences collaboration contexts in accordance with some embodiments.
Figure 5:
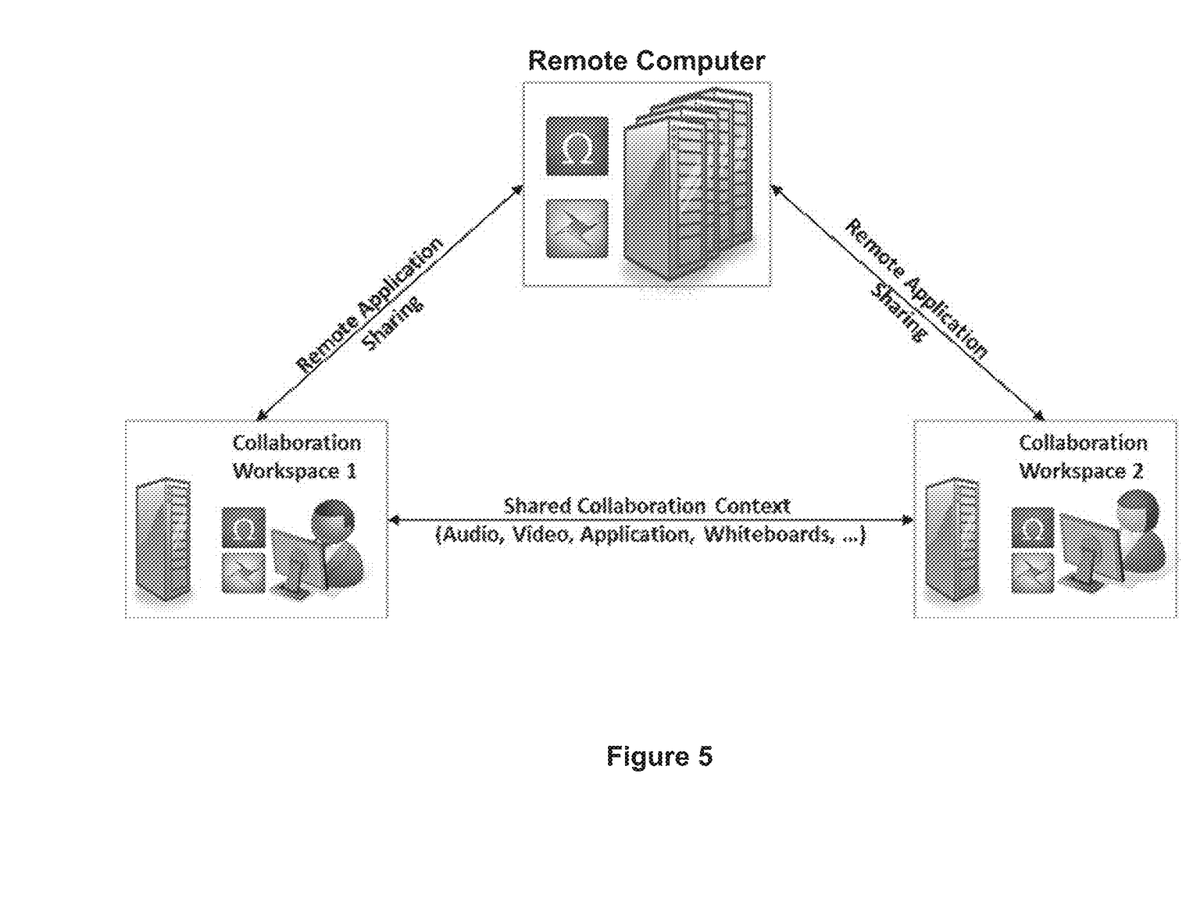

Various embodiments of the geoscience application include collaborative sharing as follows: a) any of the participants can interact with a geosciences application seamlessly (e.g., Petrel and/or Omega software by Schlumberger, as shown in FIGS. 4 and 5 or any other geoscience application). These interactions can leverage one or more of the supported interaction mechanisms—keyboard, mouse, gestures, touchscreens, etc.; b) a geosciences application could be running in one of the participating locations (or the cloud) and shared with one or more of the participants in the workspace (e.g., FIG. 4); and c) a geosciences application could be hosted on a remote compute device (server, cloud, etc.) and be accessed by one or more of the participants in the workspace (e.g., FIG. 5).

A few use-models for a geoscience collaborative workspace include, but are not limited to: a) collaborative processing or interpretation of geoscience data between two or more organizations (for example, members/locations of a service provider and members/locations of one or more client(s)); b) Collaborative processing or interpretation of geoscience data between one or more members/locations of an organization (service provider or client); c) members/locations of any participating entity in a geosciences collaboration could be (i) offices, (ii) processing/interpretation centers, (iii) dedicated collaboration rooms, (iv) oilfield site like drilling rigs or seismic crews/vessels, (v) oilfield support centers for drilling, production, etc.

Geosciences collaborations support a wide range of petrotechnical workflows including but not limited to:

Seismic survey design, modeling and analysis
Seismic and/or stratigraphic interpretation
Velocity and/or property modeling
Seismic Processing and Quality Control
Reservoir Modeling and Simulation
Well Planning
Drilling Operations and Monitoring
Production Operations and Monitoring The steps in the processing methods described above may be implemented by running one or more functional modules in information processing apparatus such as general purpose processors or application specific chips, such as ASICs, FPGAs, PLDs or other appropriate devices. These modules, combinations of these modules, and/or their combination with general hardware are all included within the scope of protection of the invention.

While the discussion of related art in this disclosure may or may not include some prior art references, applicant neither concedes nor acquiesces in the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The following patent publications are hereby incorporated by reference in their entirety:

U.S. Patent App. Pub. No. 2012/0232778
U.S. Pat. No. 8,269,814
U.S. Pat. No. 8,300,078
U.S. Pat. No. 8,264,519
U.S. Pat. No. 8,289,362
U.S. Patent App. Pub. No 2009/0207234
U.S. Design Pat. No. D618644
U.S. Design Pat. No. D610105

U.S. Design Pat. No. D663707
U.S. Pat. No. 8,144,181
U.S. Patent App. Pub. No. 2007/0070177
U.S. Pat. No. 7,532,232
U.S. Patent App. Pub. No. 2006/0158509
U.S. Patent App. Pub. No. 2006/0168302
U.S. Pat. No. 6,795,108
U.S. Patent App. Pub. No. 2007/0206091
U.S. Pat. No. 7,692,680
U.S. Patent App. Pub. No. 2005/0268823
U.S. Pat. No. 6,583,808

What is claimed is:

1. A non-transitory computer readable storage medium storing one or more programs for execution by one or more processors of a geosciences collaboration system, the one or more programs including instructions for:
communicating, over a data network, with a plurality of computer systems that includes a first computer system and a second computer system, wherein the first computer system is located remotely from the second computer system;
obtaining a first set of geosciences information from the first computer system;
distributing the first set of geosciences information from the first computer system to at least the second computer system;
receiving a manually entered user input from the second computer system;
providing the manually entered user input to the first computer system;
in response to providing the manually entered user input to the first computer system, receiving a revised set of geosciences information from the first computer system, wherein the revised set of geosciences information is distinct from the first set of geosciences information; and
repeating the receiving a manually entered user input, the providing the manually entered user input, and the receiving the revised set of geosciences information until the revised set of geosciences information is determined to satisfy accuracy criteria.

2. The computer readable storage medium of claim 1, wherein the plurality of computer systems is located remotely from the geosciences collaboration system.

3. The computer readable storage medium of claim 1, wherein the first computer system is located remotely from the geosciences collaboration system.

4. The computer readable storage medium of claim 1, wherein the first set of geosciences information includes information for one or more of: seismic survey design, seismic modeling, and seismic analysis, seismic interpretation, stratigraphic interpretation, velocity and property modeling, seismic processing, quality control, reservoir modeling and simulation, well planning, drilling operations, drilling monitoring, production operations, and production monitoring.

5. The computer readable storage medium of claim 1, wherein the manually entered user input includes a movement gesture to reorient portions of a geoscience collaboration workspace, including moving a seismic cube from a perspective view to a lateral view.

6. The computer readable storage medium of claim 5, wherein the movement gesture corresponds to a movement of a user's fingers and the movement of the user's fingers is encoded in three-dimensional coordinates.

7. The computer readable storage medium of claim 1, wherein the manually entered user input initiates zooming a seismic volume on the first computer system while the first computer system is in a first mode and the user input initiates selecting items within the seismic volume while the first computer system is in a second mode distinct from the first mode.

8. A non-transitory computer readable storage medium storing one or more programs for execution by one or more processors of a geosciences collaboration system, the one or more programs including instructions for:
communicating, through over a data network, with a plurality of computer systems;
invoking a first geosciences application on a first computer system of the plurality of computer systems and obtaining a first set of geosciences information from the first computer system;
invoking a second geosciences application on a second computer system of the plurality of computer systems and obtaining a second set of geosciences information from the second computer system, at least one of the first computer system and the second computer system located remotely from the geosciences collaboration system;
distributing the first set of geosciences information obtained from the first computer system to the plurality of computer systems and the second set of geosciences information obtained from the second computer system to the plurality of computer systems;
in response to the distributing the second set of geosciences information, receiving feedback on the second set of geosciences information from the first computer system; and
in response to the distributing the first set of geosciences information, receiving feedback on the first set of geosciences information from the second computer system.

9. The computer readable storage medium of claim 8, wherein the first geosciences application is the same as the second geosciences application.

10. The computer readable storage medium of claim 8, wherein the first computer system is located remotely from the geosciences collaboration system.

11. The computer readable storage medium of claim 8, wherein the second computer system is located in an oilfield support center.

12. The computer readable storage medium of claim 11, wherein the first computer system is located on one of: a drilling rig and a seismic vessel.

13. The computer readable storage medium of claim 8, wherein the first computer system and the second computer system are configured to share collaboration context directly between the first computer system and the second computer system without sharing the collaboration context with the geosciences collaboration system.

14. The computer readable storage medium of claim 13, wherein the collaboration context includes application information.

15. The computer readable storage medium of claim 8, including distributing the first set of geosciences information obtained from the first computer system to the plurality of computer systems including the first computer system and the second set of geosciences information obtained from the second computer system to the plurality of computer systems including the second computer system.

16. A non-transitory computer readable storage medium storing one or more programs for execution by one or more processors of a first computer system, the one or more programs including instructions for:

obtaining a first set of geosciences information;

sending the first set of geosciences information to a geosciences collaboration system;

receiving from the geosciences collaboration system a manually entered user input entered into a second computer system located remotely from the first computer system;

in response to receiving from the geosciences collaboration system the user input:

obtaining a revised set of geosciences information that is distinct from the first set of geosciences information; and sending the revised set of geosciences information to the geosciences collaboration system; and repeating the receiving a manually entered user input, the obtaining the revised set of geosciences information, and the sending the revised set of geosciences information until the revised set of geosciences information is determined to satisfy accuracy criteria.

17. The computer readable storage medium of claim 16, wherein the first computer system is located remotely from the geosciences collaboration system.

18. The computer readable storage medium of claim 16, wherein the first set of geosciences information includes information for one or more of: seismic survey design, seismic modeling, and seismic analysis, seismic interpretation, stratigraphic interpretation, velocity and property modeling, seismic processing, quality control, reservoir modeling and simulation, well planning, drilling operations, drilling monitoring, production operations, and production monitoring.

19. The computer readable storage medium of claim 16, wherein the manually entered user input includes a movement gesture to reorient portions of a geoscience collaboration workspace, including moving a seismic cube from a perspective view to a lateral view.

20. The computer readable storage medium of claim 19, wherein the movement gesture corresponds to a movement of a user's fingers and the movement of the user's fingers is encoded in three-dimensional coordinates.

21. The computer readable storage medium of claim 16, wherein the manually entered user input initiates zooming a seismic volume on the first computer system while the first computer system is in a first mode and the user input initiates selecting items within the seismic volume while the first computer system is in a second mode distinct from the first mode.

22. A non-transitory computer readable storage medium storing one or more programs for execution by one or more processors of a first computer system, the one or more programs including instructions for:

receiving an invocation of a first geosciences application from a geosciences collaboration system;

obtaining a first set of geosciences information;

sending the first set of geosciences information to the geosciences collaboration system;

receiving from the geosciences collaboration system a second set of geosciences information, wherein the second set of geosciences information is obtained by the geosciences collaboration system from a second geosciences application on a second computer system, located remotely from the first computer system, the second geosciences application on the second computer system having been invoked by the geosciences collaboration system;

receiving from the geosciences collaboration system feedback on the first set of geosciences information; and in response to receiving the feedback on the first set of geosciences information, sending from the first computer system to the geosciences collaboration system feedback on the second set of geosciences information.

23. The computer readable storage medium of claim 22, wherein the first geosciences application is the same as the second geosciences application.

24. The computer readable storage medium of claim 22, wherein the first computer system is located remotely from the geosciences collaboration system and the second computer system is located remotely from the geosciences collaboration system.

25. The computer readable storage medium of claim 22, wherein the feedback on the second set of geosciences information is sent by the first geosciences application on the first computer system and the feedback on the first set of geosciences information is sent by the second geosciences application on the second computer system.

26. The computer readable storage medium of claim 22, wherein the second computer system is located in an oilfield support center.

27. The computer readable storage medium of claim 26, wherein the first computer system is located on one of: a drilling rig and a seismic vessel.

28. The computer readable storage medium of claim 22, wherein the first computer system and the second computer system are configured to share collaboration context directly between the first computer system and the second computer system without sharing the collaboration context with the geosciences collaboration system.

29. The computer readable storage medium of claim 28, wherein the collaboration context includes application information.

30. The computer readable storage medium of claim 22, wherein the geosciences collaboration system is configured for distributing the first set of geosciences information obtained from the first computer system to the plurality of computer systems including the first computer system and the second set of geosciences information obtained from the second computer system to the plurality of computer systems including the second computer system.

\* \* \* \* \*